(12) United States Patent
Jordan et al.

(10) Patent No.: US 8,239,594 B2
(45) Date of Patent: Aug. 7, 2012

(54) MODULAR CARD ISSUANCE SYSTEM AND METHOD OF OPERATION

(75) Inventors: James M. Jordan, Eagan, MN (US); Steven G. Dorfe, Maple Grove, MN (US)

(73) Assignee: DataCard Corporation, Minnetonka, MN (US)

( * ) Notice: Subject to any disclaimer, the term of this patent is extended or adjusted under 35 U.S.C. 154(b) by 1526 days.

(21) Appl. No.: 11/557,188

(22) Filed: Nov. 7, 2006

(65) Prior Publication Data

US 2007/0136594 A1    Jun. 14, 2007

Related U.S. Application Data

(60) Provisional application No. 60/735,952, filed on Nov. 10, 2005.

(51) Int. Cl.
*G06F 13/00* (2006.01)
*G06F 3/00* (2006.01)
*G08B 5/36* (2006.01)
*G05B 23/02* (2006.01)

(52) U.S. Cl. .............. 710/104; 710/8; 710/10; 710/301; 710/302; 713/300; 340/3.5; 340/825.52

(58) Field of Classification Search .................. 710/104, 710/8, 10, 301, 302; 713/300; 340/825.52, 340/3.5

See application file for complete search history.

(56) References Cited

U.S. PATENT DOCUMENTS

| | | | | |
|---|---|---|---|---|
| 4,050,098 A | * | 9/1977 | Seipp ................................ 712/38 |
| 4,138,599 A | * | 2/1979 | Munter .......................... 714/819 |
| 4,443,866 A | * | 4/1984 | Burgiss, Sr. .................... 710/100 |
| 4,647,123 A | * | 3/1987 | Chin et al. ........................ 439/61 |
| 5,038,317 A | * | 8/1991 | Callan et al. .................... 710/301 |
| 5,148,389 A | * | 9/1992 | Hughes .............................. 710/9 |
| 5,204,669 A | * | 4/1993 | Dorfe et al. ............. 340/825.52 |
| 5,212,631 A | * | 5/1993 | Schmidt et al. .................... 700/7 |
| 5,274,767 A | * | 12/1993 | Maskovyak .................... 710/16 |
| 5,274,781 A | * | 12/1993 | Gibart .............................. 710/16 |
| 5,428,752 A | * | 6/1995 | Goren et al. .................. 710/300 |
| 5,430,879 A | * | 7/1995 | Murai ............................ 710/268 |
| 5,608,882 A | * | 3/1997 | Abert et al. .................... 710/307 |

(Continued)

FOREIGN PATENT DOCUMENTS

DE          39 24 384         2/1990

(Continued)

OTHER PUBLICATIONS

A. Poschmann and P. Krogel, "Autoconfiguration Management fur Feldbusse—PROFIBUS Plug & Play," Elektrotechnik und Informationstechnik (2000), vol. 117, No. 5, p. 335-339.

(Continued)

*Primary Examiner* — Paul R Myers
*Assistant Examiner* — Christopher a Daley
(74) *Attorney, Agent, or Firm* — Hamre, Schumann, Mueller & Larson, P.C.

(57) ABSTRACT

A modular card issuance system comprises a plurality of sequentially ordered modules configured such that each module is in electrical communication with its adjacent modules. This system also comprises a main controller that is in electrical communication with each of the modules. Upon power-up of the system and without assistance from the main controller, each module determines its own identity, its relative position among the plurality of modules and the total number of modules in the system. This information is then reported to the main controller upon request from the main controller.

36 Claims, 5 Drawing Sheets

U.S. PATENT DOCUMENTS

| | | | |
|---|---|---|---|
| 6,484,215 B1 * | 11/2002 | Gibart et al. | 710/9 |
| 6,516,377 B1 * | 2/2003 | Brinkhus | 710/305 |
| 6,585,155 B2 * | 7/2003 | Nishimura | 235/381 |
| 7,035,951 B2 * | 4/2006 | Bui et al. | 710/104 |
| 7,357,320 B2 * | 4/2008 | Sato et al. | 235/451 |
| 2004/0117526 A1 * | 6/2004 | Benson et al. | 710/107 |
| 2006/0208093 A1 * | 9/2006 | Cromer et al. | 235/492 |
| 2007/0101169 A1 * | 5/2007 | Male et al. | 713/300 |

FOREIGN PATENT DOCUMENTS

| | | |
|---|---|---|
| JP | 1994.302180 | 10/1994 |
| JP | 7-182268 | 7/1995 |
| JP | 2003-006574 | 1/2003 |
| JP | 2004-248228 | 9/2004 |
| WO | 93/04433 | 3/1993 |

OTHER PUBLICATIONS

Supplementary European Search Report for European application No. 06 83 9802, dated Apr. 19, 2010.

* cited by examiner

MODULAR CARD ISSUANCE SYSTEM AND METHOD OF OPERATION

CROSS-REFERENCE TO RELATED APPLICATIONS

The present application claims the benefit of U.S. Provisional Patent Application Ser. No. 60/735,952 entitled "MODULAR CARD ISSUANCE SYSTEM AND METHOD OF OPERATION," filed on Nov. 10, 2005, which is herewith incorporated by reference in its entirety.

BACKGROUND OF THE INVENTION

1. Field of the Invention

This invention relates generally to the field of modular card issuance systems. More particularly, the invention relates to a modular card issuance system that allows solely the function modules of a card issuance system to determine the system's configuration and report this information to a main system controller upon system power-up.

2. Description of the Prior Art

Modular card issuance systems are used to produce large volumes of a variety of different types of personalized identity documents including, but not limited to, credit cards, licenses, personal identification cards, calling cards, and booklets such as passports, among other types of documents. Generally, these systems include a number of different modules that perform various functions. These functions can include but are not confined to magnetic encoding, embossing, smart card programming, laser printing, cleaning, and laminating of personalized documents. Examples of card issuance systems are numerous.

Referring particularly now to U.S. Pat. No. 5,204,669, entitled Automatic Station Identification Where Function Modules Automatically Initialize, issued Apr. 20, 1993 to Dorfe et. al., and assigned to the assignee of the present invention, a modular card producing system and method are disclosed for dynamically assigning addresses to a plurality of programmable function modules within the system. The system disclosed in the '669 patent utilizes a primary controller unit to query the system function modules in order to assign each module a unique address and to determine the connection sequence of each function module. Known modular card issuance systems require a primary or master controller to arbitrate between the function modules in order to determine the relative sequence between the modules.

Although modular card issuance systems are becoming more technologically advanced, a need still exists for a system that allows function modules within a modular card issuance system to independently establish, (using peer-to-peer communications solely between the modules), the total number of modules in the system, the relative position of each function module in the sequence of system modules, and the identity or module type associated with each function module.

SUMMARY OF THE INVENTION

The present invention is directed to a system and method for determining the modular configuration of a card issuance system. The card issuance system most preferably includes a plurality of function modules and a main controller that allows, via a desired communications protocol, the modules to determine, independently of the main controller, the system's configuration and report this information to the main controller. More particularly, the card issuance system is configured to allow peer-to-peer communications solely between the function modules within a modular card production system via a desired communications protocol such as a serial communications protocol, to independently establish the total number of modules in the card issuance system, the relative position of each function module in the sequence of system modules, and the identity or module type associated with each function module.

Each module can then report this information to the main controller without the main controller going out and querying the modules for this information. This allows the main controller and the card issuance system to be more efficient. Users can arrange any order of modules during power-down and have the modules themselves determine the system configuration upon power-up, allowing the controller to more efficiently establish instructions for the project.

In one embodiment of this technology, a system comprises a plurality of sequentially ordered modules, where each module is coupled to an adjacent upstream and/or downstream module. This system also comprises a main or primary controller in electrical communication with each of the modules. Those skilled in the art will readily appreciate the controller could be any suitable control unit such as, but not limited to, a CPU, personal computer, microprocessor, microcomputer, microcontroller, and many other types of data processing control units. Upon power-up of the system and without assistance from the main controller, each module determines via the desired communications protocol link, its own identity, its relative position among the plurality of modules and the total number of modules in the system. This information is then reported to the main controller, when requested via the main controller.

BRIEF DESCRIPTION OF THE DRAWINGS

Other aspects and features of the present invention and many of the attendant advantages of the present invention will be readily appreciated as the same becomes better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
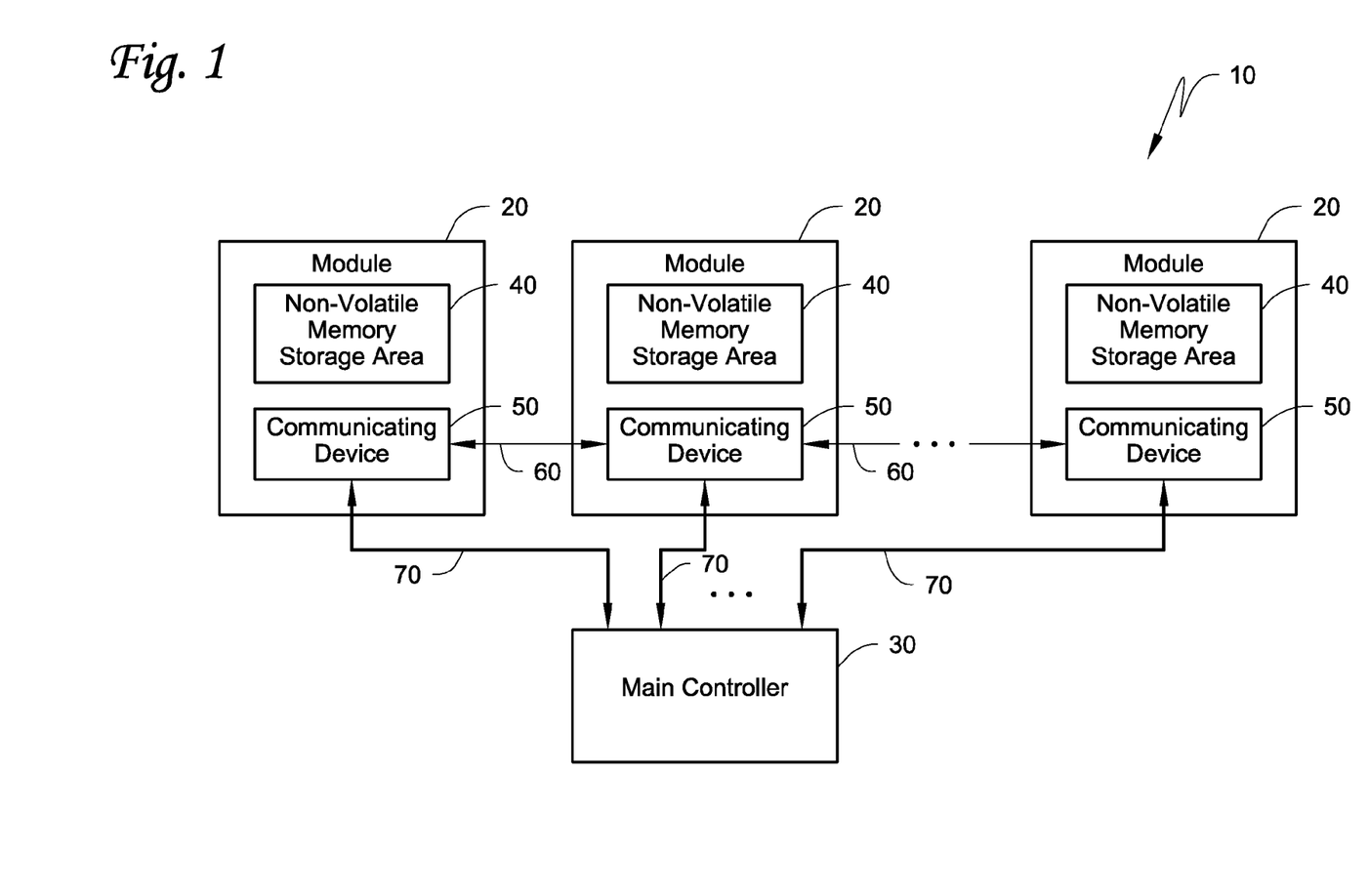
FIG. 1 is a block diagram illustrating a modular card issuance system according to one embodiment of the present invention.
Figure 2:
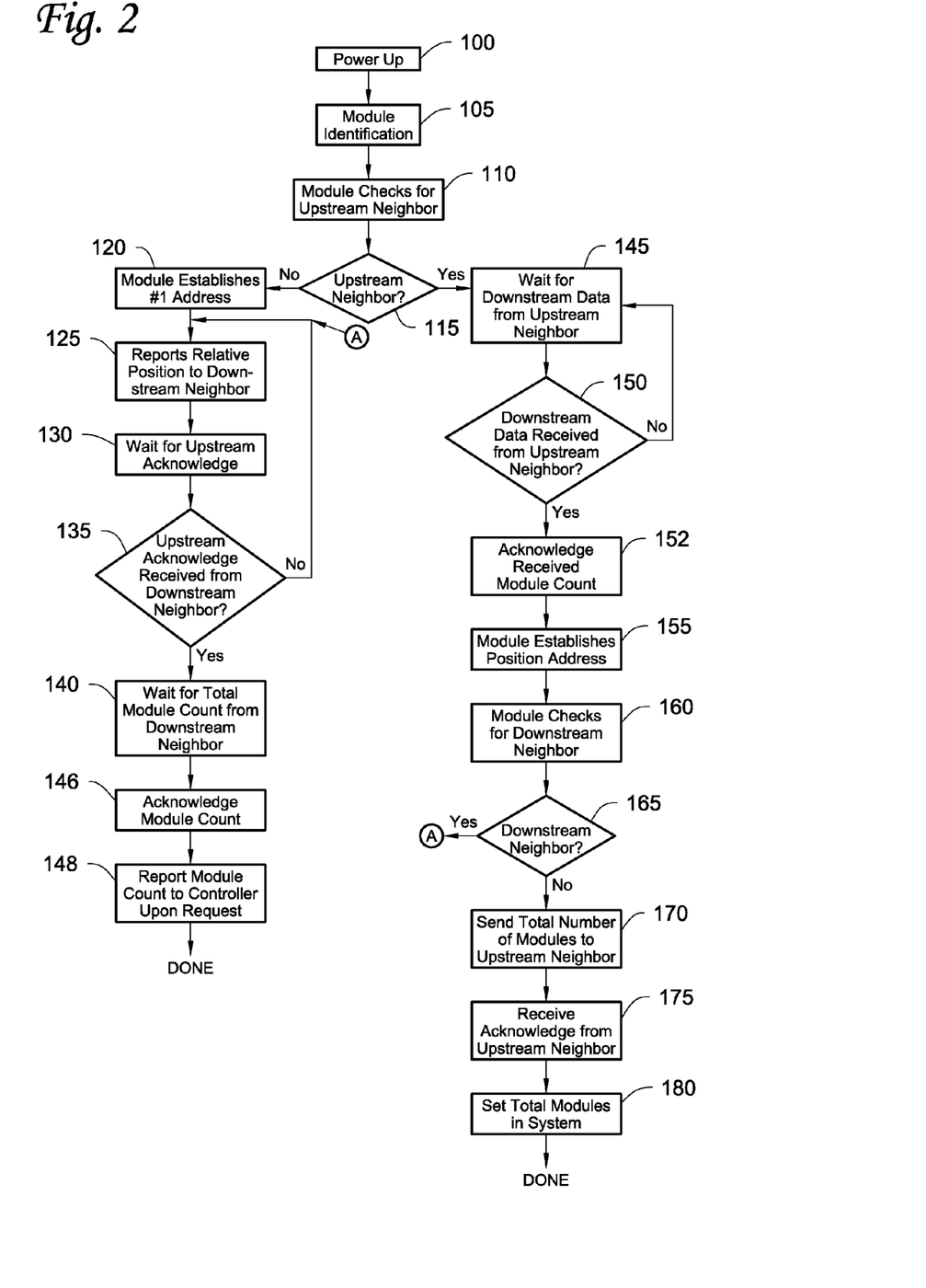
FIG. 2 is a flow diagram showing one embodiment of the steps taken by each module to determine the modular configuration of the system depicted in FIG. 1.

FIGS. 1 and 2 are first described herein below to provide a more solid understanding of the basic inventive principles prior to a discussion of the following FIGS. 3-5 that illustrate a more detailed embodiment of the present invention. FIG. 1 illustrates a block diagram of a modular card issuance system while FIG. 2 is a flow diagram illustrating one embodiment of steps employed by each system module to determine the modular configuration of the card issuance system.

Looking now at FIG. 1, a block diagram illustrates a modular card issuance system 10. System 10 can be used to create personalized identity cards such as national ID cards, driver's licenses and the like. System 10 can also be used to create personalized identity booklets such as passports and the like.

The modular card issuance system 10 comprises a plurality of sequentially ordered modules 20, each coupled to a main controller 30 and to its immediate upstream and downstream neighbor. Each module 20 of system 10 is designed to perform a distinct function used to produce a large volume of personalized identity documents. Examples of modules 20 that may be included in the system 10 are a magnetic stripe module for writing data to and reading data from a magnetic stripe on the documents, an embossing module for forming embossed characters on the documents, a smart card programming module for programming an integrated circuit chip on the documents, a printer module for performing monochromatic or multi-color printing, a laser module for performing laser personalization on the documents, a graphics module for applying monochromatic data and images to the documents, a cleaning module for cleaning the documents, a topping module for applying a topcoat to the documents, and a document punching module to punch or cut a hole into the documents and/or to punch the document into a specific shape.

Within each module 20, are a non-volatile memory storage area 40 and a communicating device SO. The identity or particular module type of each module 20 is stored in its non-volatile memory 40. Using communicating device 50, each module 20 is configured to send and receive data to and from its adjacent upstream and downstream neighbor through a communications link 60 that may accommodate, for example, a desired serial communications protocol. Communicating device 50 also allows each module 20 to report information to and receive instructions from controller 30 through a communications link 70 that may accommodate, for example, an Ethernet link. Communications link 60 is dedicated to communications between modules 20; while communications link 70 is used solely for communications with a modular card issuance system controller 30. Communications links 60 and communications links 70 are each configured to accommodate separate and distinct communications schemes that may include, but are not limited to serial communications protocols, parallel communication protocols, high-speed Ethernet, or can optionally be replaced with wireless communications protocol links.

In operation, system 10 supports automatic module configuration by the modules 20 themselves and reporting this information to controller 30. Upon power-up of system 10, the peer-to-peer communications scheme between adjacent modules 20 allows the first module to report its relative position to its adjacent downstream module 20 through communications link 60, which likewise transfers this information to the next adjacent downstream module. This process continues until the last module receives the relative position data from its adjacent upstream module, whereupon this information is reported to the controller 30 through communications link 70, upon request via the controller 30. Thus, using a communications link 60, each module 20 knows the total number of modules 20 in system 10 and the relative position of each module 20. This communications scheme allows the controller 30 to be able to use a topology-independent communications scheme such as a high-speed Ethernet protocol, while still supporting automatic machine reconfiguration upon power-up of system 10. This scheme also allows the configuration of the modular card issuance system 10 to be changed during power-off; and upon power-up, system 10 can immediately recognize its new configuration.

FIG. 2 is a flow diagram of one embodiment of the steps taken by each module 20 to determine the modular configuration of system 10. Determination of the modular configuration begins at block 100 upon power-up of system 10, which includes powering-up each module 20. Upon power-up, each module 20 looks to its non-volatile memory storage 40 to determine its particular identity or modular type, shown at block 105. Using desired communication techniques, each module 20 then checks for an adjacent upstream module at block 110 through communications link 60.

If module 20, at conditional block 115, determines it has no adjacent upstream module then module 20 is the first module in system 10 and moves onto block 120. At block 120, the first sequential module 20 establishes the number one address in communicating with controller 30. Module 20, at block 125, then reports its relative position to the adjacent downstream module and then at block 130, waits for an upstream Acknowledge through communications link 60 from the adjacent downstream module. As shown in conditional block 135, module 20 will continue to wait until it receives the upstream Acknowledge from the adjacent downstream module. Once the upstream Acknowledge is received, module 20 then waits for a total module count from the adjacent downstream module as seen in block 140. Upon receipt of the total module count, module 20 Acknowledges receipt of the module count at block 146 and reports the total module count to the main system controller 30 when so instructed by the main controller 30 at block 148.

If module 20, at conditional block 115, determines it has a connection through communications link 60 with the adjacent upstream module, then module 20 begins to wait for module count data from the adjacent upstream module at block 145. As shown in conditional block 150, module 20 will continue to wait until it receives module count data from its upstream neighbor. Once receipt of the module count data is acknowledged at block 152, which contains the relative position address of each prior module 20, the present module 20 establishes its position address in the sequence of modules at block 155. Module 20 then checks to see if it there is an adjacent downstream module, shown at block 160.

If module 20, at conditional block 165, determines there is yet another adjacent downstream module, then the process repeats itself starting at block 125.

If module 20, at conditional block 165, determines there is no adjacent downstream module, then module 20 is the last module in system 10 and moves onto block 170. At block 170, module 20 reports the total number of modules to its adjacent upstream neighbor. Upon receipt of an Acknowledge from the adjacent upstream neighbor at block 175, module 20 sets the total number of modules in system 10 at block 180 to finish the process.

Figure 3:
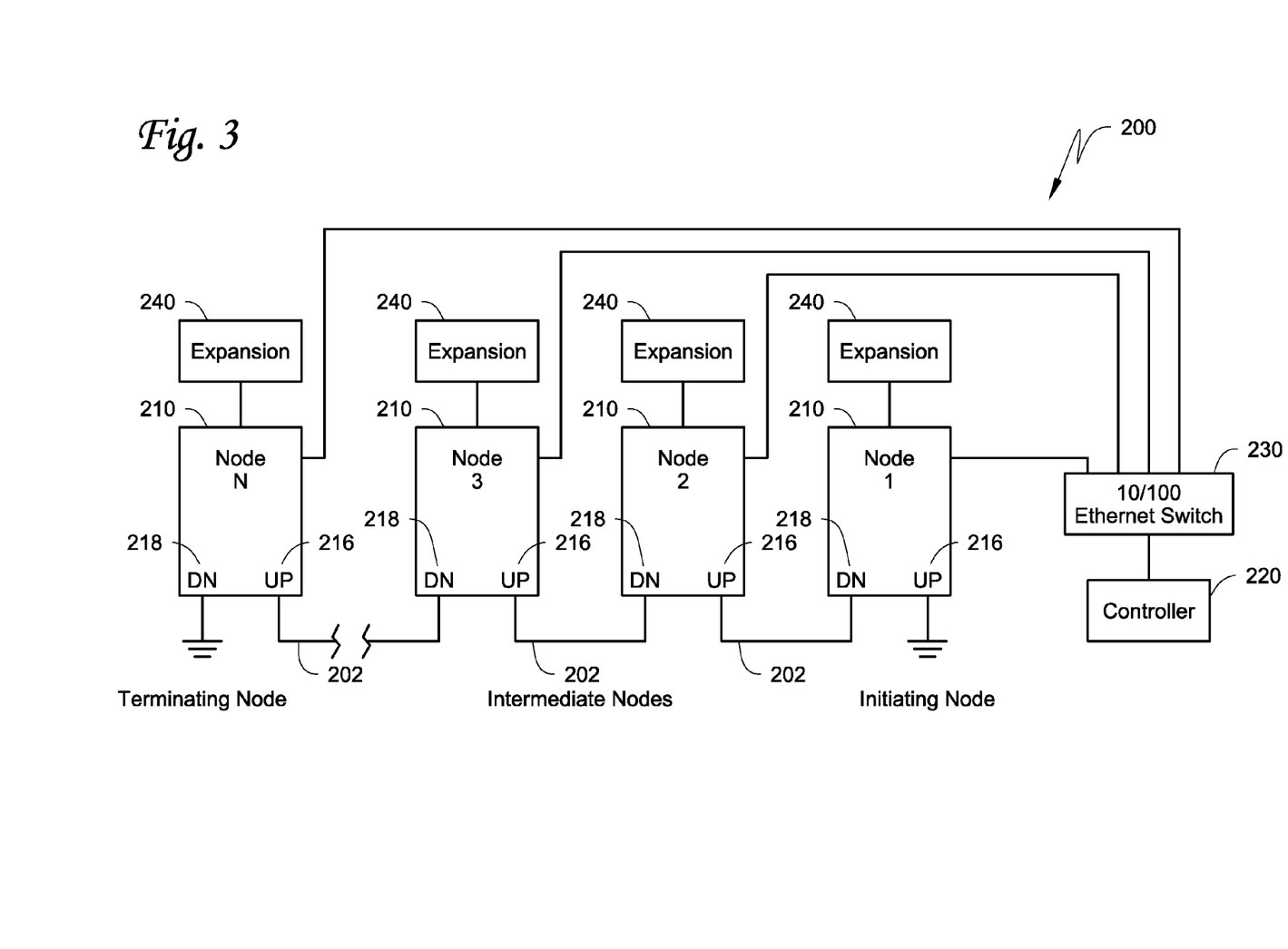
FIG. 3 is a block diagram illustrating a modular card issuance system according to another embodiment, and further illustrating a serial communication protocol for configuring the system modules.

FIG. 3 is a block diagram illustrating a modular card issuance system 200 according to another embodiment, and further illustrating a communications link 202 for configuring the system modules 210. The modular card issuance system 200 can be seen to include four modules 210. System 200 also includes a PC controller 220 and an Ethernet switch 230. A typical modular card issuance system may have about fifteen modules 210 with the ability to expand to about twenty-four modules 210, excluding card delivery. The present invention is not so limited, and it shall be understood that particular embodiments my employ more or less modules 210. Ethernet communication speed is typically 100 Mbps; The Ethernet switch 230 will most preferably have enough ports to accommodate a typical configuration with additional space to add more ports. The communications link 202 will be used to configure the system 200 during a power-on process, described herein below. Upon completion of the power-on process, the communications link 202 may be used as a watchdog (described herein below) to reset modules 210 that have lost control. The communications link 202 may be physically routed with the requisite AC power such that once turned on, AC power will remain on at the modules 210 unless either the associated circuit breaker, or e-stop switch, (described herein below), is open. A PC controller on-off switch, (not shown), is used solely to activate the PC controller.

The communications link 202 can be, for example, a synchronous, half-duplex point-to-point (RS-485) serial link between modules (nodes) 210 within the system 200. Each module (herein after referred to as node) 210 has an incoming serial link as well as an outgoing serial link. The "incoming" serial link is connected to an "upstream" node port 216 (closer to an associated input hopper). The "outgoing" serial link is connected to a "downstream" node port 218 (in the direction of an output stacker).

Each node 210 is identified as an "initiating" node, an "intermediate" node, or a "terminating" node. An initiating node (normally the system's input hopper), is identified as such by the absence of an upstream serial link and the presence of a downstream serial link. An intermediate node will have both an upstream and downstream serial link. A terminating node will have only an upstream serial link, as shown in FIG. 3.

Hardware internal to each node 210, will provide a signal to an associated node logic board signaling the presence or absence of each dedicated communications link 202. Each node 210 can be seen to have an expansion board 240. Each expansion board 240 employs communications hardware, described herein below, that serves two functions. The first or primary function of the associated communications hardware is directed to assigning the node 210 Ethernet and/or IP address based on the physical position of the node in the system, as described herein before with reference to FIG. 2. The second function is directed to acting as a watchdog, detecting and recovering from a "lost" module 210, every time power is applied to the system 200.

Figure 4:
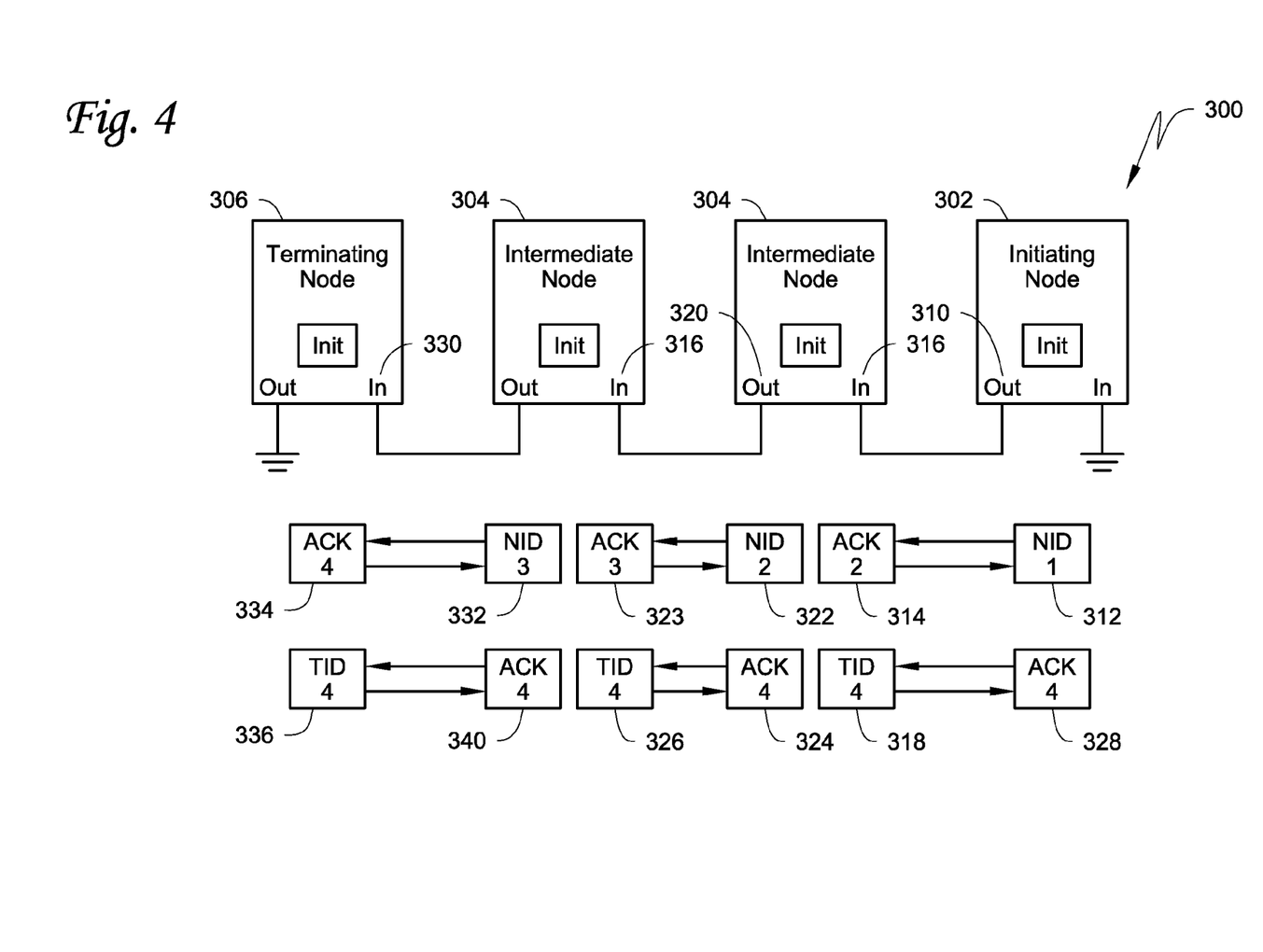
FIG. 4 is a pictorial diagram illustrating a serial communication initialization sequence according to one embodiment of the present invention.
Figure 5:
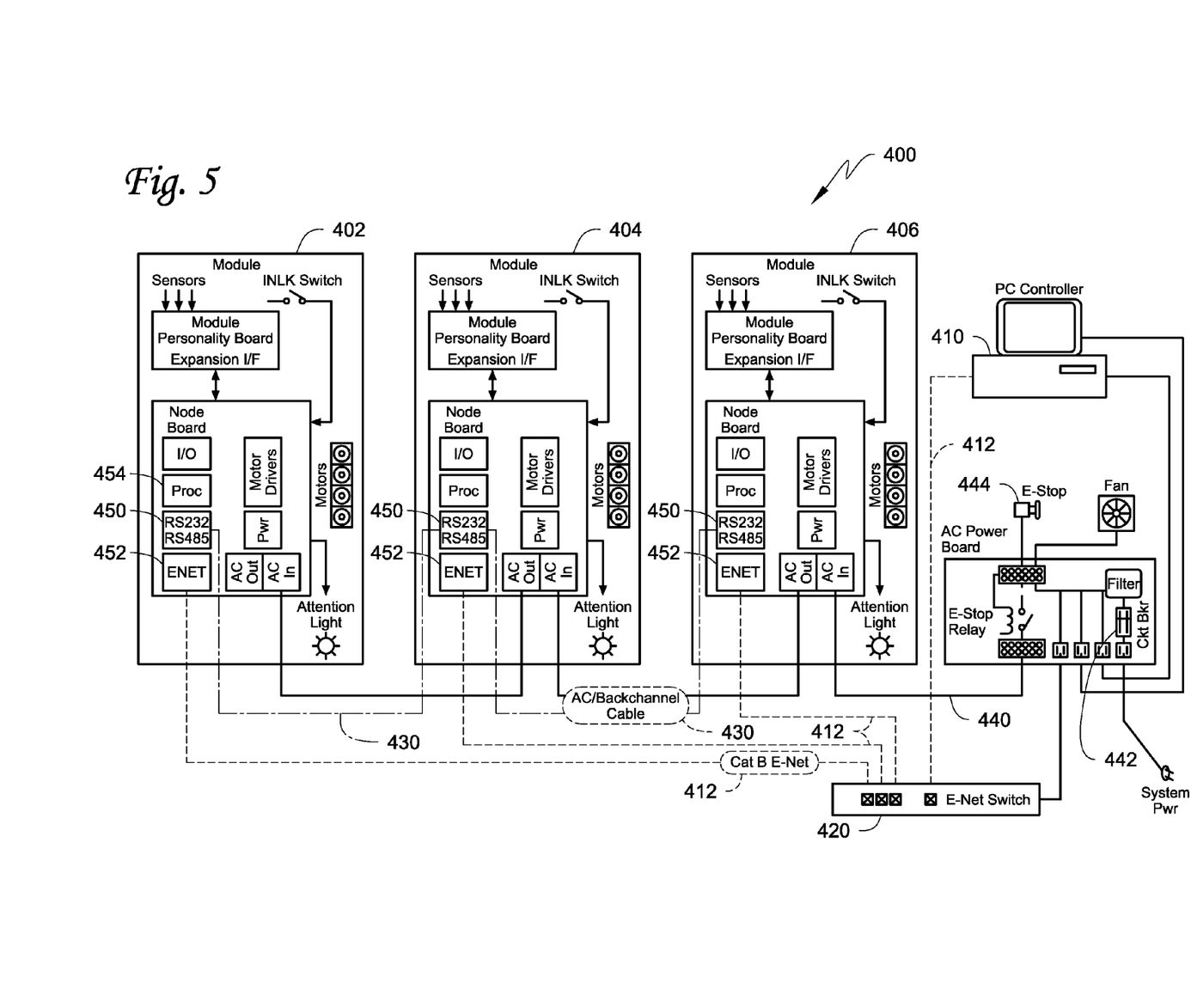
FIG. 5 is a more detailed modular card issuance system block diagram according to one embodiment of the present invention.

The aforesaid process of assigning Ethernet (MAC) and IP addresses to the nodes is the first stage of a two stage boot process associated with the embodiment described herein with reference to FIGS. 3-5. Once the node addresses are determined, each node 210 will load and execute embedded software modules from an on-board flash device associated with the respective node 210, thereby establishing control with the primary or main, e.g., PC controller 220. Upon successfully linking up with the PC controller 220, a node startup script file, specified as part of the node's boot parameters, is loaded and executed. The startup script file will, under normal conditions, direct the loading and execution of the associated node's firmware application.

When a system operator activates the PC controller 220, the controller 220 simply has to query the system 200 to instantly access the number, type and order of node data in the system 200, as well as the firmware and hardware (e.g. FPGA) versions loaded in any particular node 210.

A more detailed description of a communication process that is suitable to implement a modular card issuance system in accordance with the principles set forth above is now described herein below with reference to FIG. 4. FIG. 4 is a pictorial diagram illustrating a serial communications protocol initialization sequence 300 according to one embodiment of the present invention. Initiating node 302, intermediate node 304 and terminating node 306 initialization processes are shown in FIG. 5.

Initiator Node Initialization

A node determined to be an initiator will normally be an input hopper module in a system using the inventive principles describe herein. With reference now to FIG. 4, an initiator module 302 will not have an upstream serial channel connected since it is the first module in the system, but will have an output serial communications link 310 connected to the next downstream module.

An initiating node 302 commences the node initialization sequence by issuing a Node ID (NID) frame on the node's output serial communications link 310 to its neighboring downstream module. On issuing the NID frame, the initiating node will set a response timer waiting for a response frame transmitted from the downstream module acknowledging receipt of the NID frame. If the initiating module 302 fails to receive a response frame, the NID is retransmitted and the response timer restarted. This process will continue until the downstream module responds.

On receipt of the NID frame, the downstream node will then respond by transmitting an Acknowledge (ACK) frame out the module's incoming serial communications link 316 to inform the transmitting node the frame had been received.

On receipt of the ACK frame 314, the initiating node 302 will wait to receive a Total node ID (TID) frame 318. This frame 318 will be generated by the terminating node 306 and returned to the initiating node 302. The TID frame 318 will therefore contain the total number of nodes detected in the card issuance system 200. This value will be returned to the PC controller 220 during the second phase of initialization after the operating system has been booted, and the Ethernet link becomes operational. On receipt of the TID frame 318, the initiating node 302 will locate the operating system in the node's flash (enumerated as number 40 in FIG. 1), load it into node memory, and transfer control to it. At this point the Ethernet connection is initialized and the first phase of initialization is complete for the initiating node. The remainder of initialization is completed under the control of the operating system in the node.

Intermediate Node Initialization

A node with both an incoming communications link and an outgoing communications link is defined to be an intermediate node 304. An intermediate node 304 will wait for a NID frame 312 to be received on the node's incoming communications link 316, having been transmitted by its nearest upstream neighbor. The originating node id will be retrieved from the NID frame 312. The intermediate node will then issue an ACK response frame 314 transmitting the frame out the node's incoming communications link 316 back to the node that sent the NID frame. The intermediate node 304 will then take the received (and modified) NID frame 322 and transmit it out the node's outgoing communications link 320; sending the frame to the node's downstream neighbor. The intermediate 304 node will then set a response timeout waiting for an ACK frame 323 to be received on the node's outgoing channel 320. In the event of a response timeout, the intermediate node 304 will transmit the NID frame 322 out its outgoing serial backchannel 320, and reset the response timeout. This sequence will continue until an ACK frame 323 is received.

On receipt of an ACK frame 323, the intermediate node 304 will wait for a TID frame 326 to be received on the intermediate node's outgoing serial backchannel 320. The TID frame 326 will be initiated by the terminating node and will contain the total number of nodes in the system 200. On receipt of the TID frame 326, the intermediate node 304 will acknowledge its receipt by transmitting an ACK frame 324 out its outgoing communications link 320 to its downstream neighboring module that sent the TID frame 326. The total node count will then be stored in the intermediate node's memory. The intermediate node will then propagate the TID frame 326 back to the initiating node 302 by transmitting the TID frame 326 out the intermediate node's incoming communications link 316 to its upstream neighbor. On receipt of an ACK frame 328 from the intermediate node's incoming communications link 316, the intermediate node 304 will have completed the first phase of system initialization. The intermediate node will enter the second phase of system initialization by loading the operating system from the node's flash into memory beginning at a desired address. Control is then be passed to the operating system.

The node communications link is used to identify a module's position in the machine and make sure it is running properly. In one embodiment, it works in association with a node board FPGA, a multi-ported RS485 interface and a system Ethernet connection. The physical layer connection for the node communications link resides on each node board with an upstream and downstream port.

Terminator Node Initialization

The terminating node 306 of a modular card issuance system 200 will have an incoming communications link 330 but no outgoing communications link. Initialization of the terminating node 306 will be similar to an intermediate node 304 with the exception that the received NID frame 332 is not forwarded (since there is no outgoing serial backchannel). Instead, the terminating node 306 will increment the node id in the received NID frame 332. The terminating node issues an ACK frame 334 out the node's incoming communications link 330 acknowledging receipt of the NID frame 332, and changes the NID frame 332 to a TID frame 336. The TID frame 336 is then transmitted out the node's incoming serial backchannel 330, beginning its return trip to the initiating node. On receipt of an ACK frame 340, the terminating node 306 will have competed the first phase of system initialization.

The terminating node will enter the second phase of initialization by loading and passing control to the operating system. The remainder of the system operation will be under control of the operating system.

In addition to performing the system initialization function, the function module communications link 202 will be used to detect and recover from a module losing control (watchdog function). Most preferably, the primary controller 220 has a mechanism that it can use to reboot the modules when necessary due to firmware and/or FPGA code updates, or in case of catastrophic error. The watchdog function can be accomplished through the use of a hardware watchdog timer that runs in the FPGA of every node. Once the watchdog timer is enabled, the node will be required to reset the watchdog timer before a timer expires. If the watchdog timer expires, the watchdog hardware will reset the module node board causing the board to reboot.

To facilitate a better understanding of the inventive principles discussed herein before, a detailed system block diagram depicting the electrical architecture, is discussed herein below with reference to FIG. 5.

Looking now at FIG. 5, a block diagram depicts a more highly detailed modular card issuance system 400 according to one embodiment of the present invention. The system 400 includes three modules 402, 404, 406 and a single PC controller 410 that communicates with the modules via a high-speed Ethernet link 412. An Ethernet switch 420 includes ports to accommodate a typical configuration, with additional space in the enclosure to add more, as stated herein before. A serial communications link (i.e. backchannel cable) 430 is used to configure the system 400. The connection provides physical location information to each module 402, 404, 406, and provides a watchdog function which will reset any module that may have problems. System power is distributed through an AC power bus 440 originating at either the controller or within a module. AC power is always on at the modules 402-406 unless either a circuit breaker 442 or e-stop switch 444 is open.

The system communications link 430 is used to identify a module's position in the machine 400 and make sure it is running properly. The communications link 430 operates in conjunction with a node board FPGA, multi-ported RS-485 interface 450 and the system Ethernet connection 452. The physical layer connection for the communications link 430 resides on each node board with an upstream and downstream port, as described herein before. This connection may coexist in the same cable as the AC wiring.

The communications link 430 will operate in one of two states, as stated herein before. The first state (configuration) can be entered from either power-up or a warm reset issued by the node board processors 454 that may be commanded by the PC controller 410 through the established Ethernet connection 412. Each node board can preferably be reset via a programmable logic device such as a CPLD, not shown, such that a reset can originate via a power supply monitor or via a reset port attached to the node board processor 454.

The FPGA, (also enumerated as number 40 in FIG. 1), configures itself and begins statically examining the downstream communications link 430. This connection may, for example, be high if it is tied to another module, or low, if left open (output end of the machine 400). If the module 402-406 detects a low, it begins to send a first symbol to the upstream connector. After sending the first symbol, the module listens on the upstream port for a second symbol response. If this response fails to appear, the module retransmits the first symbol. If the module fails to receive an echo, eventually it will indicate it is at the beginning of the machine (input end detected).

State two (watchdog) is entered after the system 400 configuration is established and the node processor 454 has enabled the watchdog. Each node board 402-406 continues to send and receive its symbols with its upstream and downstream partners (exceptions understandably exist at the ends of the machine which have been programmed by the node processor 454 to only send and receive through only one of its two ports). The node processor 454 enables the watchdog function, as stated herein before, such that once enabled, the watchdog is refreshed by the exchange of symbols. If either end stops communicating, the watchdog will reset the board using a node board programmable logic device.

Looking again at FIG. 1, each card issuance module 20 is further operational upon power-up, to determine not only its type, but also versions of downloadable code contained within the function module 20 upon insertion of the module 20 into the modular card issuance system 10. Each card issuance system function module 20 is configured to communicate with the card issuance system controller 30 to determine whether a newer version of downloadable function module code is available on the controller 30. Each function module 20 then operates to receive updated code from the controller 30 and to install the updated code in the function module non-volatile memory storage area 40. Further, each card issuance module 20 is most preferably operational upon power-up, to declare itself a generic module type in the event it is unable to determine its type, and to communicate the generic module type data to the card issuance system controller 30 such that the function module type is able to be reprogrammed via the card issuance system controller 30 upon request of a controller operator. Each card issuance system function module 20 is further operational to recognize and update versions of function module-specific configuration information contained within the function module 20, and to automatically reboot on completion of the update, such that the function module 20 invokes the newly updated code while retaining its relative position among a plurality of modules as originally determined upon power-up of the system 10.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A card issuance system comprising:
   a plurality of sequentially ordered function modules, wherein each module is configured to send and receive data to communicate with an adjacent upstream or downstream module; and
   a main controller in communication with each function module;
   wherein upon power-up of the system, each function module is configured to determine its own module type and its relative position among the plurality of function modules without assistance from the main controller, such that the module type data and relative position data are available to the main controller upon request from the main controller.

2. The card issuance system according to claim 1, wherein each module comprises a non-volatile memory storage area and a communicating device.

3. The card issuance system according to claim 2, wherein the non-volatile memory storage area within each module stores the module type of the module.

4. The card issuance system according to claim 2, wherein the non-volatile memory storage area comprises at least one device selected from the group consisting of an EEPROM, a PLD, a battery-backed RAM, a flash memory, an EPROM, a PROM, a ROM, a jumper wire, a magnetic disk, a bubble memory, and a FRAM.

5. The card issuance system according to claim 2, wherein the communicating device operates to communicate with the adjacent upstream and downstream modules using a first communication scheme and further operates to communicate with the main controller using a second communication scheme.

6. The card issuance system according to claim 5, wherein the first communication scheme is defined by a serial communication protocol other than Ethernet.

7. The card issuance system according to claim 5, wherein the second communication scheme is defined by an Ethernet protocol.

8. The system according to claim 1, wherein the plurality of modules communicate with the main controller using a topology-independent communications scheme.

9. The system according to claim 8, wherein the topology-independent communications scheme is Ethernet.

10. The system according to claim 1, wherein each module is configured to determine the total number of modules in the system without assistance from the main controller.

11. The card issuance system according to claim 1, wherein the relative position of each module determined based on relative position data received from an adjacent upstream or downstream function module.

12. A method of operating a modular card issuance system, the method comprising:
    providing a plurality of sequentially ordered function modules and a main system controller such that each function module operates to send and receive data to communicate with an adjacent upstream and downstream function module using a first communication protocol and further operates to communicate with the main controller using a second communication protocol;
    determining, via the first communication protocol, the module type and relative position of each module without assistance from the main controller; and
    transmitting the module type and relative position data to the main system controller, via the second communication protocol, in response to commands from the main system controller to the function modules.

13. The method according to claim 12, wherein the step of determining the module type and relative position of each module comprises the steps of:
    checking for the adjacent upstream and downstream module;
    querying the adjacent upstream module for its relative position data;
    establishing a relative position address based on the relative position data received from the adjacent upstream module; and
    transmitting the relative position address to the adjacent downstream module.

14. The method of claim 13, wherein the first module in the sequence of the plurality of modules determines its position when the module finds no adjacent upstream module while checking for the adjacent upstream and downstream module.

15. The method of claim 13, wherein the first module in the sequence of the plurality of modules does not wait for downstream data and immediately establishes the first position address.

16. The method of claim 13, further comprising the steps of:
    querying the adjacent downstream module for total number of modules data; and
    waiting for and receiving the total number of modules data from the adjacent downstream module.

17. The method of claim 16, further comprising the step of transmitting the total number of modules data to the adjacent upstream module.

18. The method of claim 17, wherein the first module in the sequence of the plurality of modules does not send the total number of module data to the adjacent upstream module.

19. The method of claim 13, wherein the last module in the sequence of the plurality of modules determines its relative position when the module finds no downstream adjacent module while checking for the adjacent upstream and downstream module.

20. The method of claim 13, wherein the last module in the sequence of the plurality of modules does not report its relative position to the adjacent downstream module.

21. A card issuance system comprising:
a plurality of sequentially ordered function modules, wherein each module operates to send and receive data to exchange data with an adjacent upstream and downstream module, but not with non-adjacent function modules, and further wherein upon power-up of the system, each module is configured to determine its own module type and its relative position among the plurality of modules in the system without assistance from a system controller, such that the identity data and the relative position data is available to the system controller.

22. The card issuance system according to claim 21, wherein each function module is configured to communicate with the adjacent upstream and downstream modules using a first communication scheme and to communicate with a system controller using a second communication scheme.

23. The card issuance system according to claim 22, wherein the first communication scheme is defined by a serial communication protocol other than Ethernet.

24. The card issuance system according to claim 22, wherein the second communication scheme is a topology-independent communications scheme.

25. The card issuance system according to claim 24, wherein the topology-independent communications scheme is Ethernet.

26. A card issuance system function module that is operational and configured, upon power-up, to determine, without assistance from a card issuance system controller its module type and its relative position among a plurality of modules upon insertion of the module into a modular card issuance system, such that the relative position data is available to another upstream and downstream card issuance system function module using a serial communications protocol scheme solely between modular card issuance system function modules upon insertion of the function module into the modular card issuance system.

27. The card issuance module according to claim 26, wherein the function module is configured to communicate with other upstream and downstream card issuance system function modules using a first communication scheme and further to communicate with the card issuance system controller using a second communication scheme.

28. The card issuance system function module according to claim 27, wherein the first communication scheme is a serial communication protocol other than Ethernet.

29. The card issuance system function module according to claim 27, wherein the second communication scheme is a topology-independent communications scheme.

30. The card issuance system function module according to claim 29, wherein the topology-independent communications scheme is Ethernet.

31. The card issuance module according to claim 26, wherein the function module is further operational and configured, upon power-up, to determine its module type and versions of downloadable code contained within the function module upon insertion of the module into the modular card issuance system.

32. The card issuance module according to claim 31, wherein the function module is configured to communicate with the card issuance system controller to determine whether a newer version of downloadable function module code is available on the controller.

33. The card issuance module according to claim 32, wherein the function module is further configured to receive updated code from the controller and to install the updated code in a function module non-volatile memory storage area.

34. The card issuance module according to claim 26, wherein the function module is further operational and configured, upon power-up, to declare itself a generic module type in the event it is unable to determine its type, and to communicate the generic module type data to the card issuance system controller such that the function module type is able to be reprogrammed via the card issuance system controller upon request of a controller operator.

35. The card issuance module according to claim 26, wherein the function module is further operational and configured to recognize and update versions of function module-specific configuration information contained within the function module.

36. The card issuance module according to claim 35, wherein the function module is configured to automatically reboot on completion of the update, such that the function module invokes the newly updated code while retaining its relative position among a plurality of modules as originally determined upon power-up of the system.

\* \* \* \* \*